United States Patent
Schupska et al.

(10) Patent No.: US 8,561,762 B2
(45) Date of Patent: Oct. 22, 2013

(54) BRAKE PISTON WITH STEEL CORE AND PHENOLIC OUTER LAYER

(75) Inventors: Peter Schupska, Plain City, OH (US); Jeff Platt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 843 days.

(21) Appl. No.: 12/553,155

(22) Filed: Sep. 3, 2009

(65) Prior Publication Data

US 2011/0048869 A1 Mar. 3, 2011

(51) Int. Cl.
*F16D 55/18* (2006.01)
*F16J 9/00* (2006.01)
*B60T 11/00* (2006.01)

(52) U.S. Cl.
USPC .............................. 188/72.4; 92/248; 188/370

(58) Field of Classification Search
USPC .......... 188/71.1, 72.4, 72.6, 73.1, 73.31, 370; 92/248
See application file for complete search history.

(56) References Cited

U.S. PATENT DOCUMENTS

| | | | |
|---|---|---|---|
| 2,926,757 A | 3/1960 | Armstrong | |
| 3,442,356 A | 5/1969 | Hahm | |
| 4,170,926 A | 10/1979 | Emmett | |
| 4,499,977 A | 2/1985 | Wang | |
| 4,572,334 A | 2/1986 | Villata | |
| 4,583,623 A | 4/1986 | Ritsema | |
| 4,798,270 A | 1/1989 | Schneider et al. | |
| 4,809,821 A | 3/1989 | Fulmer | |
| 4,809,825 A | 3/1989 | Oltmanns, Jr. et al. | |
| 5,031,511 A * | 7/1991 | Villata | 92/128 |
| 5,172,793 A * | 12/1992 | Temple et al. | 188/72.4 |
| 5,386,890 A * | 2/1995 | Itsuaki | 188/73.35 |
| 5,577,641 A | 11/1996 | De Laforcade et al. | |
| 6,146,727 A | 11/2000 | Dannels | |
| 6,382,367 B1 * | 5/2002 | Varzescu et al. | 188/72.7 |
| 6,481,543 B1 * | 11/2002 | Shaw et al. | 188/71.9 |
| 6,490,964 B2 | 12/2002 | Buynacek | |
| 6,729,445 B1 | 5/2004 | Qian et al. | |
| 6,868,323 B2 | 3/2005 | Kichima et al. | |
| 7,083,164 B2 * | 8/2006 | Lanterman et al. | 267/119 |
| 2007/0029142 A1 | 2/2007 | Drennen et al. | |
| 2010/0101899 A1 * | 4/2010 | Finkel | 188/71.6 |

FOREIGN PATENT DOCUMENTS

JP 59108850 * 6/1984
JP 63167132 * 7/1988

* cited by examiner

*Primary Examiner* — Bradley King
*Assistant Examiner* — Vishal Sahni
(74) *Attorney, Agent, or Firm* — Mark E. Duell; Emerson Thomson Bennett, LLC

(57) ABSTRACT

A brake piston may include a steel core and a phenolic outer layer that may be overmolded to the steel core.

16 Claims, 5 Drawing Sheets

BRAKE PISTON WITH STEEL CORE AND PHENOLIC OUTER LAYER

I. BACKGROUND OF THE INVENTION

A. Field of Invention

This invention relates generally to automotive braking systems and more specifically to the manufacture and use of automotive brake pistons.

B. Description of the Related Art

It is well known in the art to provide automotive vehicles with various types of brake systems. Some brake systems use a brake caliper mechanism that includes a pair of brake pads that straddle a brake rotor or disc and a brake piston that is positioned within a bore formed in the brake caliper housing. A drive mechanism is used to move the brake piston within the bore to force the brake pads into contact with opposite sides of the brake rotor to slow and stop the rotation of the brake rotor and thus to slow and stop the vehicle. One known drive mechanism uses hydraulic fluid pressure to cause the brake piston to move. Another known drive mechanism uses an electric motor to cause the brake piston to move. It is also known to combine a hydraulic brake system with an electric brake system to provide two methods for moving the brake piston. US Patent Application Publication No. 2007/0029142, for example, discloses a brake piston which can be moved with a hydraulic service brake operation and with an electric park brake operation.

It is known to form brake pistons out of steel due to the various forces and temperature variations exerted on them. Steel brake pistons offer advantages such as good chip resistance and good compression strength but they also come with disadvantages such as relatively large specific gravities and relatively high thermal conductivities. More recently, it is known to form brake pistons out of phenolic resin. Phenolic brake pistons offer advantages such as relatively low specific gravities and relatively low thermal conductivities but they also come with disadvantages such as poor chip resistance and a relatively low ash temperature.

Therefore, what is needed is a brake piston that combines the benefits of steel and phenolic resin.

II. SUMMARY OF THE INVENTION

According to one embodiment of this invention, a brake system may comprise: a brake caliper housing comprising a bore and, first and second portions defining a rotor channel therebetween that receives an associated automotive wheel brake rotor; a first brake member that is: (1) for use in engaging a first side of the associated automotive wheel brake rotor; and, (2) attached to the first portion of the brake caliper housing portion; a second brake member that is: (1) for use in engaging a second side of the associated automotive wheel brake rotor; and, (2) attached to the second portion of the brake caliper housing portion; a brake piston that is slidably mounted within the bore and that comprises: (1) a metal core having an opening; and, (2) a phenolic outer layer attached to the metal core; a hydraulic brake system that uses hydraulic fluid pressure to cause the brake piston to slide within the bore to cause the first and second brake members to engage the first and second sides of the associated automotive wheel brake rotor in response to the actuation of the hydraulic brake system; and, an electric parking brake system comprising a spindle nut that is received within the opening in the metal core and a spindle operatively attached to the spindle nut, wherein the electric parking brake system uses an electric motor to cause the spindle to rotate within the spindle nut to cause the brake piston to slide within the bore to cause the first and second brake members to engage the first and second sides of the associated automotive wheel brake in response to the actuation of the electric parking brake.

According to another embodiment of this invention, a brake piston for use with an automotive wheel brake caliper may comprise: a steel core; a phenolic outer layer attached to the steel core; and, a first end with a brake member contact surface that contacts an associated brake member to cause it to engage an associated automotive wheel brake rotor. The brake member contact surface may be located on an outer surface of the steel core that has no phenolic material thereon.

According to yet another embodiment of this invention, a method may comprise the steps of: (A) providing a first brake system comprising: (1) a brake caliper housing comprising a bore and, first and second portions defining a rotor channel therebetween that receives an associated automotive wheel brake rotor; (2) a first brake member that is: (a) for use in engaging a first side of the associated automotive wheel brake rotor; and, (b) attached to the first portion of the brake caliper housing portion; and, (3) a second brake member that is: (a) for use in engaging a second side of the associated automotive wheel brake rotor; and, (b) attached to the second portion of the brake caliper housing portion; (B) providing a first metal core; (C) attaching a first phenolic outer layer to the first metal core to form a first brake piston that is sized to operate within the bore of the first brake system; (D) positioning the first brake piston within the bore of the first brake system; and, (E) activating a brake system to cause the first brake piston to slide within the bore of the first brake system to cause the first and second brake members to engage the first and second sides of the associated automotive wheel brake.

One advantage of this invention is that the mass of a brake piston is reduced.

Another advantage of this invention is that the thermal insulation of the brake fluid is improved.

Still another advantage of this invention is that a single sized brake piston core can be used in multiple sized brake caliper pistons simply by changing the outer layer size and/or shape.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
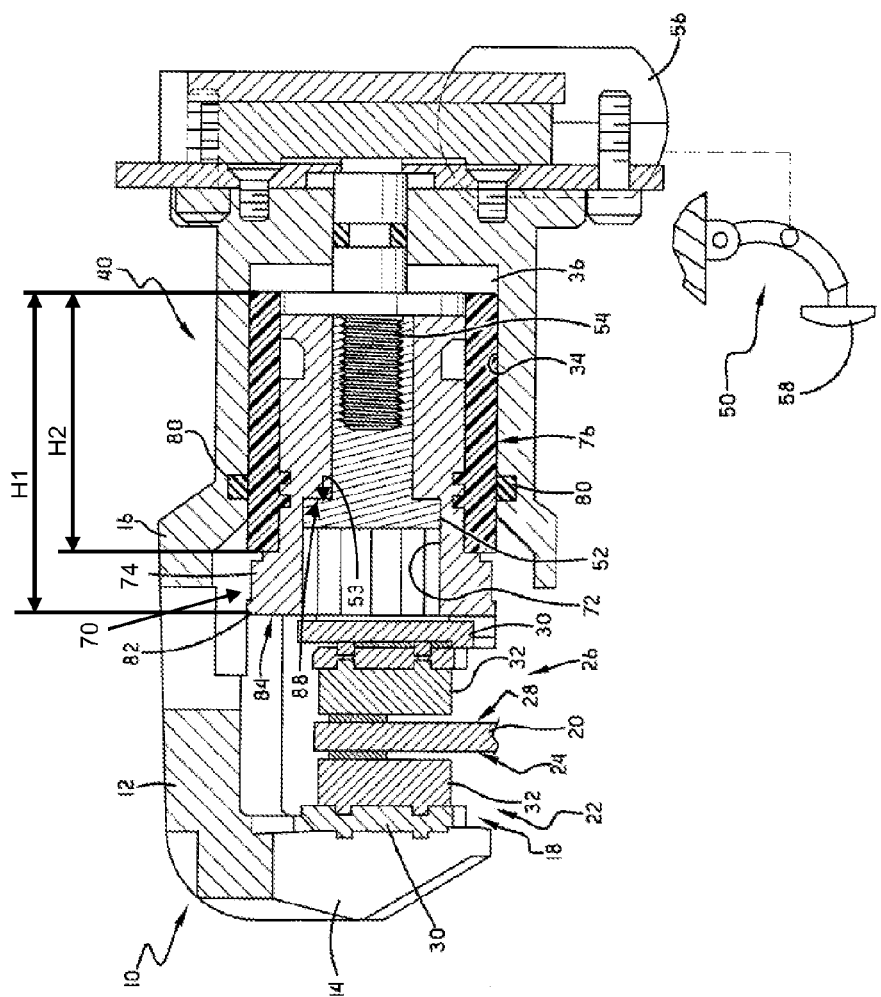
FIG. 1 is a section view of a brake system, with some components shown in schematic form, according to one embodiment of this invention.
Figure 3:
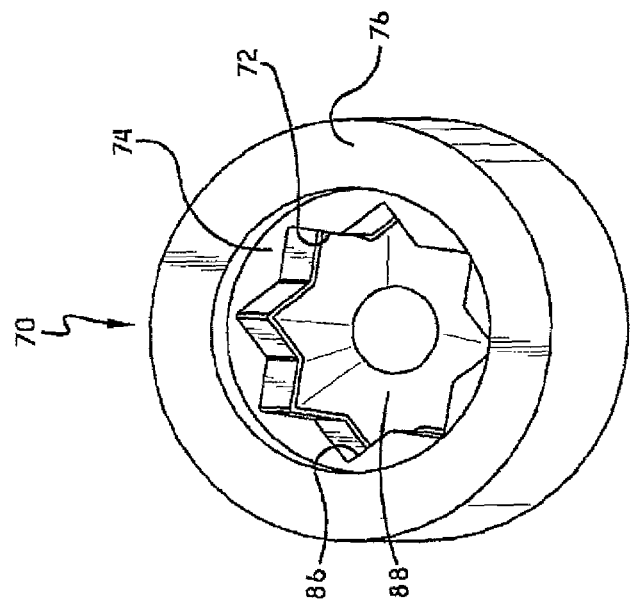
FIG. 3 is an end view of the brake piston shown in FIG. 2.
Figure 2:
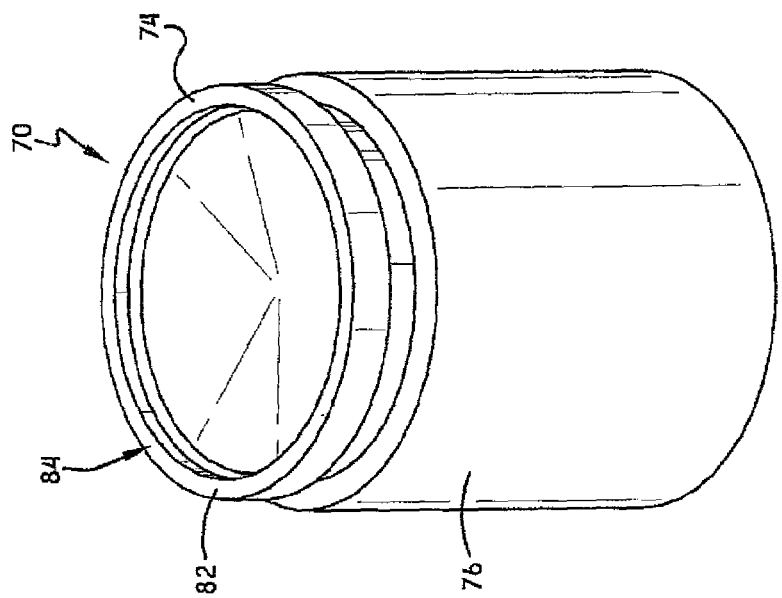
FIG. 2 is a perspective view of a brake piston.
Figure 5:
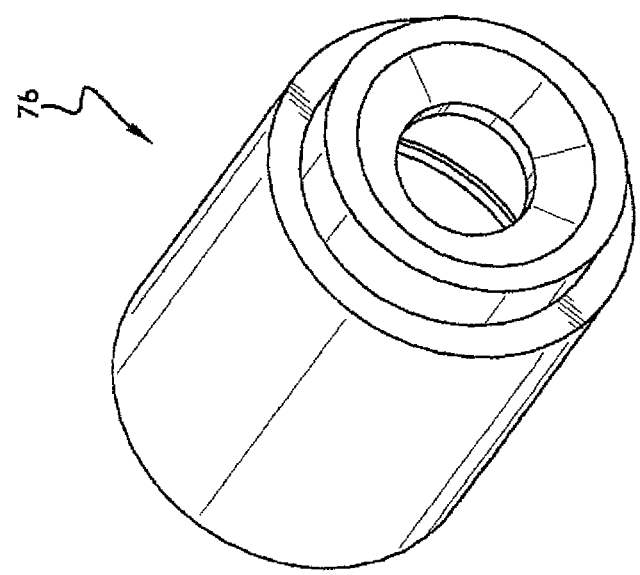
FIG. 5 is a perspective view of an outer layer used to make the brake piston shown in FIG. 2.
Figure 4:
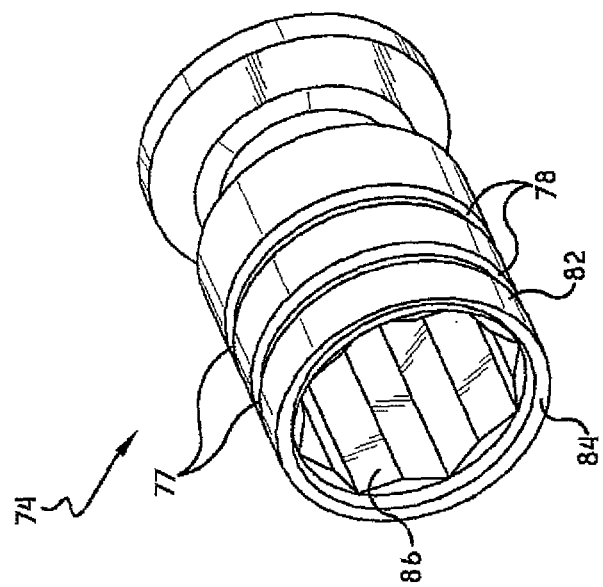
FIG. 4 is a perspective view of a core used to make the brake piston shown in FIG. 2.

Referring now to the drawings wherein the showings are for purposes of illustrating embodiments of the invention only and not for purposes of limiting the same, and wherein like reference numerals are understood to refer to like components, FIG. 1 shows a brake system 10 that may be used with a vehicle (not shown) such as an automotive vehicle, according to one embodiment of this invention. The brake system 10 may include a brake caliper housing 12 having first and second portions 14, 16 defining a rotor channel 18 therebetween that receives an associated vehicle wheel brake rotor or disc 20. The brake system 10 may also include a first brake member 22 that is used in engaging a first side 24 of the wheel brake rotor 20 and that is attached to the first portion 14 of the brake caliper housing 12. Similarly, the brake system 10 may include a second brake member 26 that is used in engaging a second side 28 of the wheel brake rotor 20 and that is attached to the second portion 16 of the brake caliper housing 12. The first and second brake members 22, 26 can be of any type and size chosen with the sound judgment of a person of skill in the art. For the embodiment shown, each brake member 22, 26 includes a brake pad 30 having a brake shoe 32 attached thereon. The brake system 10 may also include a brake piston 70 having an opening 72 that is slidably mounted within a bore 34 formed in the brake caliper housing 12.

Figure 7:
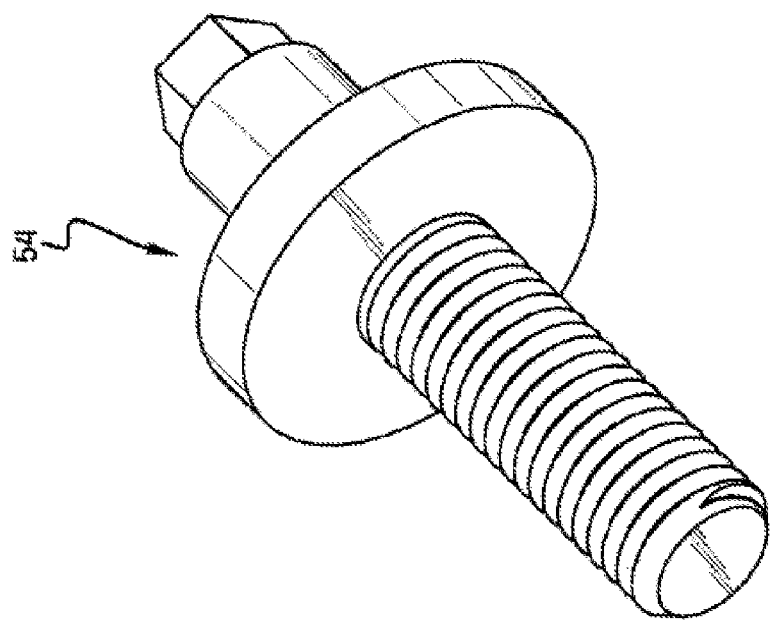
FIG. 7 is a perspective view of a spindle.
Figure 6:
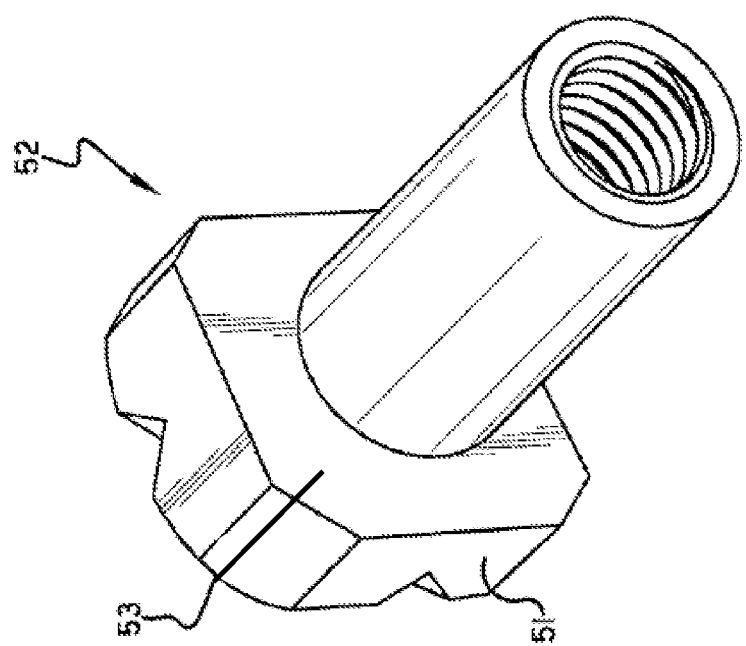
FIG. 6 is a perspective view of a spindle nut.
Figure 8:
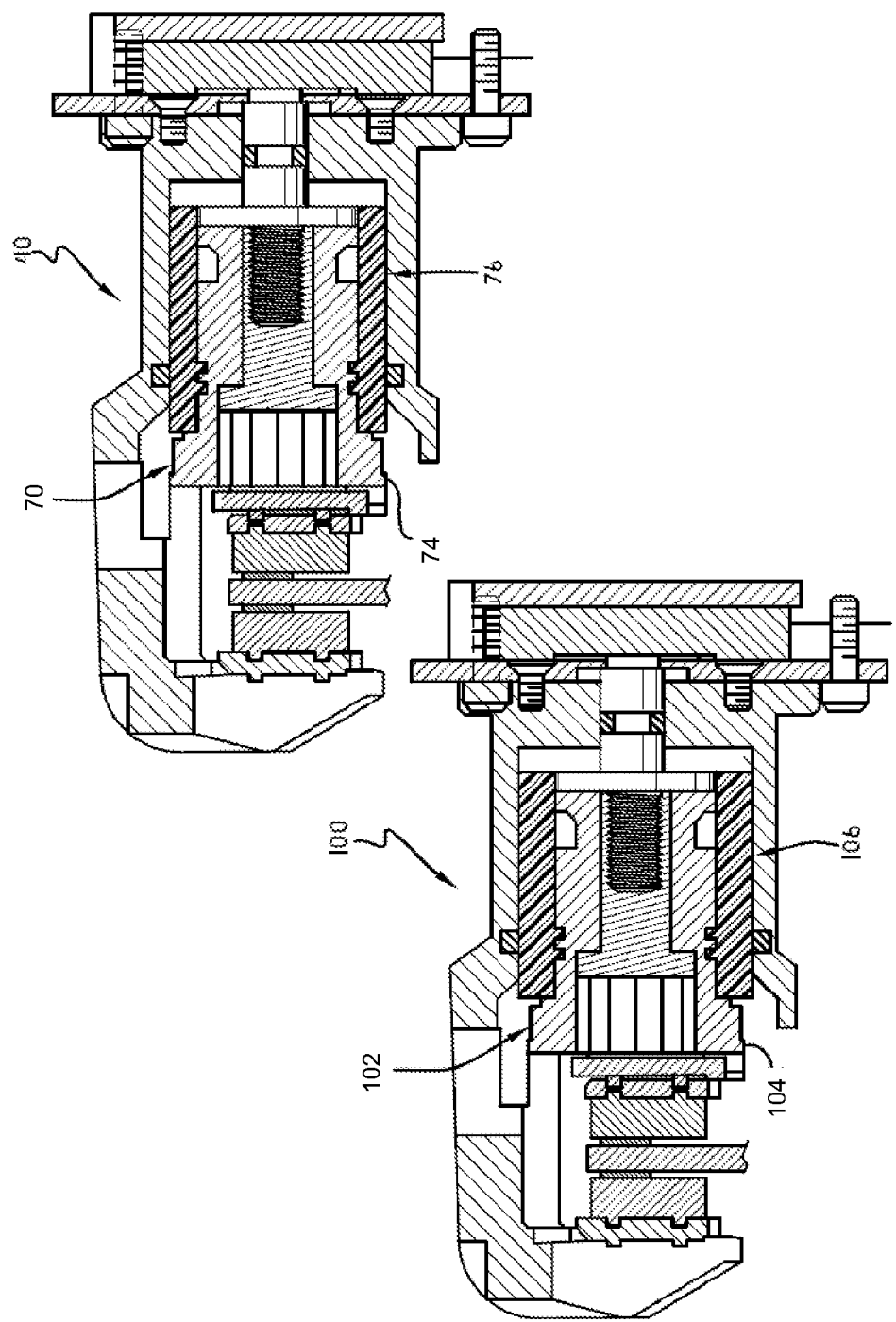
FIG. 8 is a section view of two brake systems, with some components shown in schematic form, according to one embodiment of this invention.

With reference now to FIGS. 1, 6 and 7, the brake system 10 may include a hydraulic brake system 40 and an electric parking brake system 50. The hydraulic brake system 40 may use hydraulic or brake fluid pressure in a known manner to cause the brake piston 70 to slide within the bore 34 to cause the first and second brake members 22, 26 to engage the first and second sides 24, 28 of the wheel brake rotor 20. In one specific embodiment, hydraulic fluid may be provided into a hydraulic fluid chamber 36 defined between the brake piston 70 and the caliper housing 12. Thus, a brake force may be transmitted to the rotor 20 in response to the actuation of the hydraulic brake system 40. As the operation of a hydraulic brake system is known to those of skill in the art, further details will not be discussed here. The electric parking brake system 50 may include a spindle nut 52 that is received within the piston opening 72 and a spindle 54 operatively attached to the spindle nut 52. An electric motor 56 may be used to operate the electric parking brake system 50 in any manner chosen with the sound judgment of a person of skill in the art. For the embodiment shown, a parking brake device 58, such as a brake pedal illustrated, can be actuated by an operator. In response, the electric motor 56 may cause the spindle 54 to rotate in any known manner within the spindle nut 52 thereby causing the brake piston 70 to slide within the bore 34 to cause the first and second brake members 22, 26 to engage the first and second sides 24, 28 of the wheel brake rotor 20. Thus, a brake force may be transmitted to the rotor 20 in response to the actuation of the electric parking brake system 50. As the operation of an electric parking brake system including the spindle and spindle nut is known to those of skill in the art, further details will not be discussed here.

With reference now to FIGS. 1-5, the brake piston 70 will be discussed further. The brake piston 70 may include a core 74 having an axial height H1 and an outer layer 76 having an axial height H2. As shown, H2 is at least .5H1. The opening 72 may be formed in the core 74, as shown. The core 74 may be formed substantially of a metal and the outer layer 76 may be formed substantially of phenolic material. In one embodiment, the core 74 is formed substantially of steel and the phenolic outer layer 76 is attached to the core 74 in a process known as overmolding. As the process of overmolding is known to those of skill in the art, further details will not be discussed here. In one embodiment, at least one surface variation 77 is formed on an outer surface of the core 74 to improve retention of the outer layer 76 to the core 74 during the overmolding process. By surface variation it is meant a change on the surface that is either concave or convex with respect to the surrounding surface. In the specific embodiment shown in FIG. 4, two surface variations 77 are shown in the form of radial grooves 78, 78 which are, of course, concave. In an alternate embodiment (not shown) the surface variation 77 may be a rib or other convex variation in the outer surface of the core 74. A caliper piston seal 80 may be positioned between the brake caliper housing surface defining the bore 34 and the outer layer 76 to maintain proper closure around the piston 70.

With reference now to FIGS. 1-7, the brake piston 70 may have a first end 82 with a brake member contact or mating surface 84 that contacts the second brake member 26 to cause it to engage or contact the second side 28 of the wheel brake rotor 20. In one embodiment, the brake member contact surface 84 is located on an outer surface of the metal core 74 that has no outer layer 76. Thus, the brake member contact surface 84 in this embodiment has no phenolic material improving the mating engagement of the brake piston 70 to the brake member 26. The opening 72 in the core 74 may be defined by a surface that includes a first spindle nut contact surface 86 that is contacted by a first outer surface 51 of the spindle nut 52 to prevent rotation of the spindle nut 52 with respect to the brake piston 70. The opening 72 in the core 74 may also be defined by a second spindle nut contact surface 88 that is contacted by a second outer surface 53 of the spindle nut 52 to force the brake piston 70 to slide within the bore 34. In one embodiment, the second spindle nut contact surface 88 is angled, as shown, to provide a better surface for the spindle nut 52 to act upon. In one embodiment, neither the first nor the second spindle nut contact surfaces 86, 88 has a phenolic material thereon improving the mating engagement of the spindle nut 52 to the brake piston 70.

With reference now to FIGS. 1-5, it should be noted that in one embodiment of this invention a single piston core size can be used to form numerous brake piston sizes simply by changing the overmold sizes and/or shape. The overmold size and/or shape may be varied by changing only the overmolding die shape. In one specific embodiment, a first brake system 40 may include a brake caliper housing having a first bore while a second brake system 100 may include a brake caliper housing having a second bore where the size of the second bore is substantially different than the size of the first bore. A first sized and/or shaped phenolic outer layer 76 may be attached to a first metal core 74 having a size to form a first brake piston 70 that is sized to operate within the first bore. A second sized and/or shaped phenolic outer layer 106 (sized or shaped significantly different than the first phenolic outer layer 76) may be attached to a second metal core 104 having a size that is substantially the same as the first metal core 74 to form a second brake piston 102 that is sized to operate within the second bore. In this way a single sized core 74 may be kept in inventory to form multiple sized brake pistons 70 simply by varying the outer layer 76 that is overmolded or otherwise attached to the core 74.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:
1. A brake system comprising:
   a brake caliper housing comprising a bore and, first and second portions defining a rotor channel therebetween that receives an associated automotive wheel brake rotor;
   a first brake member that is: (1) for use in engaging a first side of the associated automotive wheel brake rotor; and, (2) attached to the first portion of the brake caliper housing;
   a second brake member that is: (1) for use in engaging a second side of the associated automotive wheel brake rotor; and, (2) attached to the second portion of the brake caliper housing;
   a brake piston that is slidably mounted within the bore and that comprises: (1) a metal core having an axial height H1 and having an opening; and, (2) a phenolic outer layer that has an axial height H2 that is at least 0.5H1 and that is attached to the metal core; wherein:
   the metal core is formed substantially of steel;
   the phenolic outer layer of the brake piston is overmolded onto the metal core;
   the metal core has at least one surface variation that is either concave or convex with respect to surrounding outer surfaces of the metal core; and,
   the phenolic outer layer covers the surrounding outer surfaces and completely covers the surface variation, to improve retention of the phenolic outer layer to the metal core, such that no other material or part contacts the metal core at the surface variation;
   a hydraulic brake system that uses hydraulic fluid pressure to cause the brake piston to slide within the bore to cause the first and second brake members to engage the first and second sides of the associated automotive wheel brake rotor in response to the actuation of the hydraulic brake system; and
   an electric parking brake system comprising a spindle nut that is received within the opening in the metal core and a spindle operatively attached to the spindle nut, wherein the electric parking brake system uses an electric motor to cause the spindle to rotate within the spindle nut to cause the brake piston to slide within the bore to cause the first and second brake members to engage the first and second sides of the associated automotive wheel brake in response to the actuation of the electric parking brake.

2. The brake system of claim 1 further comprising:
a caliper piston seal interposed between: (1) a brake caliper housing surface defining the bore; and, (2) a phenolic outer layer surface that is parallel to the brake caliper housing surface.

3. The brake system of claim 1 wherein:
the brake piston has a first end with a brake member contact surface that contacts the first brake member to cause it to engage the first side of the associated automotive wheel brake rotor;
the break member contact surface is located on an outer surface of the metal core that has no phenolic material thereon.

4. The brake system of claim 1 wherein the surface variation is a concave radial groove.

5. The brake system of claim 1 wherein the surface variation is a convex radial rib.

6. The brake system of claim 3 wherein the second spindle nut contact surface is angled with respect to a radial plane of the brake piston.

7. A brake piston for use with an automotive wheel brake caliper, the brake piston comprising:
   a steel core having (1) an axial height H1 and (2) at least one surface variation that is either concave or convex with respect to surrounding outer surfaces of the metal core;
   a phenolic outer layer that (1) is overmolded onto the steel core, (2) has an axial height H2 that is at least 0.5H1 and (3) covers the surrounding outer surfaces and completely covers the surface variation, to improve retention of the phenolic outer layer to the metal core, such that no other material or part contacts the metal core at the surface variation; and
   a first end with a brake member contact surface that contacts an associated brake member to cause it to engage an associated automotive wheel brake rotor, wherein the brake member contact surface is located on an outer surface of the steel core that has no phenolic material thereon;
   wherein the steel core has an opening defined by a surface of the steel core that comprises:
      a first spindle nut contact surface that is contacted by a first outer surface of an associated spindle nut to prevent rotation of the associated spindle nut with respect to the brake piston;
      a second spindle nut contact surface that is contacted by a second outer surface of the associated spindle nut to force the brake piston to slide within a bore formed in the automotive wheel brake caliper; and,
      wherein neither the first nor the second spindle nut contact surfaces has a phenolic material thereon.

8. The brake system of claim 7 wherein the surface variation is a concave radial groove.

9. The brake system of claim 7 wherein the surface variation is a convex radial rib.

10. The brake system of claim 7 wherein the second spindle nut contact surface is angled with respect to a radial plane of the brake piston.

11. A method comprising the steps of:
   (A) providing a first brake system comprising:
      (1) a brake caliper housing comprising a bore and first and second portions defining a rotor channel therebetween that receives an associated automotive wheel brake rotor;
      (2) a first brake member that is: (a) for use in engaging a first side of the associated automotive wheel brake rotor; and (b) attached to the first portion of the brake caliper housing; and
      (3) a second brake member that is: (a) for use in engaging a second side of the associated automotive wheel brake rotor; and (b) attached to the second portion of the brake caliper housing;
   (B) forming a first steel core having an axial height H1, providing the first steel core with at least one surface variation that is either concave or convex with respect to surrounding outer surfaces of the steel core, defining an opening in the first steel core with a surface of the steel core that comprises: a first spindle nut contact surface and a second spindle nut contact surface, wherein neither the first nor the second spindle nut contact surfaces has a phenolic material thereon;
   (C) overmolding a first phenolic outer layer having an axial height H2 that is at least 0.5H1 to the first steel core to form a first brake piston that is sized to operate within the bore of the first brake system; wherein the phenolic outer layer completely covers the surrounding outer surfaces and completely surrounds the at least one surface variation, to improve retention of the first phenolic outer layer to the first steel core, such that no other material or part contacts the steel core at the surface variation;

(D) positioning the first brake piston within the bore of the first brake system; and (E) activating the first brake system to cause the first brake piston to slide within the bore of the first brake system to cause the first and second brake members to engage the first and second sides of the associated automotive wheel brake rotor; contacting the first spindle nut contact surface with a first outer surface of an associated spindle nut to prevent rotation of the associated spindle nut with respect to the first brake piston; and contacting the second spindle nut contact surface with a second outer surface of the associated spindle nut to force the brake piston to slide within the bore.

12. The method of claim 11 further comprising the steps of: providing a second brake system comprising:
  (1) a second brake caliper housing comprising a second bore and, third and fourth portions defining a second rotor channel therebetween that receives a second associated automotive wheel brake rotor;
  (2) a third brake member that is: (a) for use in engaging a third side of the second associated automotive wheel brake rotor; and, (b) attached to the third portion of the second brake caliper housing;
  (3) a fourth brake member that is: (a) for use in engaging a fourth side of the second associated automotive wheel brake rotor; and, (b) attached to the fourth portion of the second brake caliper housing; and,
  (4) wherein the size of the bore of the second brake system is substantially different than the size of the bore of the first brake system;

providing a second steel core that is sized substantially the same as the first steel core and that has at least one surface variation that is either concave or convex with respect to surrounding outer surfaces of the second steel core;

overmolding a second phenolic outer layer having an axial height that is at least 0.5H1 to the second steel core to form a second brake piston that is sized: (1) substantially different than the size of the first brake piston; and, (2) to operate within the bore of the second brake system; wherein the second phenolic outer layer completely covers the surrounding outer surfaces of the second steel core and completely surrounds the at least one surface variation of the second steel core, to improve retention of the second phenolic outer layer to the second steel core, such that no other material or part contacts the second steel core at its surface variation;

positioning the second brake piston within the bore of the second brake system; and, activating the second brake system to cause the second brake piston to slide within the bore of the second brake system to cause the third and fourth brake members of the second brake system to engage the third and fourth sides of the second associated automotive wheel brake rotor.

13. The method of claim 11 further comprising the step of: providing an electric parking brake system comprising: (1) an electric motor; (2) a spindle nut that is received within the opening provided in the first steel core; and, (3) a spindle operatively attached to the spindle nut; wherein:
step (E) further comprises the step of: activating the electric parking brake to operate the electric motor to cause the spindle to rotate within the spindle nut to cause the first brake piston to slide within the bore of the first brake system to cause the first and second brake members to engage the first and second sides of the associated automotive wheel brake rotor.

14. The method of claim 11 wherein the surface variation of step B is formed as a concave radial groove.

15. The method of claim 11 wherein the surface variation of step B is formed as a convex radial rib.

16. The method of claim 11 wherein the second spindle nut contact surface of step B is angled with respect to a radial plane of the first brake piston.

* * * * *